US012530582B2

(12) United States Patent
Mimaroglu et al.

(10) Patent No.: US 12,530,582 B2
(45) Date of Patent: *Jan. 20, 2026

(54) TRAINED MODELS FOR DISCOVERING TARGET DEVICE PRESENCE

(71) Applicant: Oracle International Corporation, Redwood Shores, CA (US)

(72) Inventors: Selim Mimaroglu, Arlington, VA (US); Oren Benjamin, Arlington, VA (US); Arhan Gunel, Arlington, VA (US); Anqi Shen, McLean, VA (US); Ziran Feng, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/391,298

(22) Filed: Dec. 20, 2023

(65) Prior Publication Data
US 2024/0144004 A1    May 2, 2024

Related U.S. Application Data

(63) Continuation of application No. 17/355,780, filed on Jun. 23, 2021, now Pat. No. 11,893,487.

(51) Int. Cl.
*G06N 3/08* (2023.01)
*B60L 53/60* (2019.01)
(Continued)

(52) U.S. Cl.
CPC ............... *G06N 3/08* (2013.01); *B60L 53/60* (2019.02); *G06N 3/044* (2023.01); *G06N 3/045* (2023.01);
(Continued)

(58) Field of Classification Search
None
See application file for complete search history.

(56) References Cited

U.S. PATENT DOCUMENTS 10,983,496 B1    4/2021    Aljohani et al.
2013/0289788 A1  10/2013   Gupta et al.
(Continued)

FOREIGN PATENT DOCUMENTS

CN    108899892 A    11/2018
WO    2019155214 A1   8/2019
(Continued)

OTHER PUBLICATIONS

Fawaz et al., Deep learning for time series classification: a review, arXiv:1809.045356v4 [cs.LG], May 14, 2019, pp. 1-44.
(Continued)

*Primary Examiner* — Mohammad Ali
*Assistant Examiner* — Saad M Kabir
(74) *Attorney, Agent, or Firm* — Potomac Law Group, PLLC

(57) ABSTRACT

Embodiments generate machine learning predictions to discover target device energy usage. One or more trained machine learning models configured to discover target device energy usage from source location energy usage can be stored. Multiple instances of source location energy usage over a period of time can be received for a given source location. Using the trained machine learning model, multiple discovery predictions for the received instances of source location energy usage can be generated, the discovery predictions comprising a prediction about a presence of target device energy usage within the instances of source location energy usage. And based on the multiple discovery predictions, an overall prediction about a presence of target device
(Continued)

energy usage within the given source location's energy usage over the period of time can be generated.

20 Claims, 11 Drawing Sheets

(51) Int. Cl.
    *G06N 3/044*     (2023.01)
    *G06N 3/045*     (2023.01)
    *G06Q 50/06*     (2012.01)
    *G06Q 30/0202*     (2023.01)

(52) U.S. Cl.
    CPC ......... *G06Q 50/06* (2013.01); *G06Q 30/0202* (2013.01)

(56) References Cited

U.S. PATENT DOCUMENTS

| | | |
|---|---|---|
| 2018/0328967 A1 | 11/2018 | Lange et al. |
| 2021/0380013 A1 | 12/2021 | Moszynski et al. |

FOREIGN PATENT DOCUMENTS

| | | |
|---|---|---|
| WO | 2021022199 A1 | 2/2021 |
| WO | 2021108008 A1 | 6/2021 |
| WO | 2021108010 A1 | 6/2021 |
| WO | 2021108011 A1 | 6/2021 |

OTHER PUBLICATIONS

Gaochen et al., Estimation of Target Appliance Electricity Consumption Using Background Filtering, IEEE Transactions on Smart Grid, IEEE, USA, vol. 10, No. 6, Nov. 1, 2019, pp. 5920-5929.

Hart, "Nonintrusive appliance load monitoring," Proceedings of the IEEE, vol. 80, No. 12, pp. 1870-1891, 1992.

International Search Report and Written Opinion issued in the corresponding International Application No. PCT/US2020/051182, mailed on Nov. 18, 2020.

International Search Report and Written Opinion issued in the corresponding International Application No. PCT/US2022/072874, mailed on Sep. 29, 2022.

International Search Report and Written Opinion issued in the International Application No. PCT/US2020/050986 mailed on Dec. 11, 2020.

International Search Report and Written Opinion issued in the International Application No. PCT/US2020/051186, mailed on Dec. 11, 2020.

Kelly et al., Neural NILM: Deep Neural Networks Applied to Energy Disaggregation, Proceedings of the 2nd ACM International Conference on Embedded Systems for Energy-Efficient Built Environments, Buildsys '15, Jan. 1, 2015, pp. 55-64.

Kim et al., "Nonintrusive Load Monitoring Based on Advanced Deep Learning and Novel Signature", Published Oct. 2, 2017, pp. 1-22.

Unknown, Ensemble learning, Wikipedia, Sep. 3, 2019, Retrieved from the internet https://en.wikipedia.org/w/index.php?title=Ensemble_learning&oldid=913844668.

Unknown, Nonintrusive load monitoring, Wikipedia, Oct. 12, 2019, Retrieved from the internet https://en.wikipedia.org/w/index.php?title=Nonintrusive_load_monitoring&oldid=920917729.

Zhao et al., Convolutional neural networks for time series classification, Journal of Systems Engineering and Electronics, vol. 28, No. 1, Feb. 2017, pp. 162-169.

TRAINED MODELS FOR DISCOVERING TARGET DEVICE PRESENCE

CROSS REFERENCE TO RELATED APPLICATION

This application is a continuation of U.S. patent application Ser. No. 17/355,780, titled "TRAINED MODELS FOR DISCOVERING TARGET DEVICE PRESENCE", filed Jun. 23, 2021.

FIELD

The embodiments of the present disclosure generally relate to utility metering devices, and more particularly to machine learning predictions that discover the presence of target device energy usage within household energy usage using utility metering devices.

BACKGROUND

Disaggregation of various energy usage devices at a given source location has proven challenging. For example, given a household, discovering device specific and/or electric vehicle energy usage from within the household's general monitored energy usage has been difficult to achieve, in part due to the large variety of household devices and/or electric vehicles (e.g., make, model, year, etc.). Advancements in metering devices have provided some opportunities, yet successful discovery continues to be elusive. Techniques that reliably discover energy usage from certain devices, such as electric vehicles, can provide opportunities for improved grid planning, and would greatly improve the technological field and benefit organizations that implement these techniques.

SUMMARY

The embodiments of the present disclosure are generally directed to systems and methods for generating machine learning predictions to discover target device energy usage.

One or more trained machine learning models configured to discover target device energy usage from source location energy usage can be stored. Multiple instances of source location energy usage over a period of time can be received for a given source location. Using the trained machine learning model, multiple discovery predictions for the received instances of source location energy usage can be generated, the discovery predictions comprising a prediction about a presence of target device energy usage within the instances of source location energy usage. And based on the multiple discovery predictions, an overall prediction about a presence of target device energy usage within the given source location's energy usage over the period of time can be generated.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments generate machine learning predictions to discover target device energy usage. Non-intrusive load monitoring ("NILM") and/or disaggregation refers to taking as input total energy usage at a source location (e.g., energy usage at a household provided by advanced metering infrastructure) and estimating energy usage for one or more appliances, electric vehicles, and other devices that use energy at the source location. Embodiments leverage a trained machine learning model that generates predictions about the presence or target device energy usage within general energy usage at a source location. For example, the target device may be a large appliance or electrical vehicle, the source location may be a household, and the trained machine learning model is configured to receive the energy usage of the household as input and predict whether the household energy usage includes target device energy usage.

In some embodiments, instances of household energy usage can be received over a period of time. For example, household energy usage can be received at a certain granularity level (e.g., every 15 minutes, every 30 minutes, hourly, and the like) over a period of time (e.g., a week, two weeks, a month, and the like). In some embodiments, the trained machine learning model can generate multiple prediction instances for each instance of household energy usage data (e.g., four weekly predictions over a month of time). An overall prediction can then be generated based on the multiple prediction instances. For example, analytics may be performed on the prediction instances to arrive at an overall prediction about the presence of target energy usage within household energy usage over the period of time.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
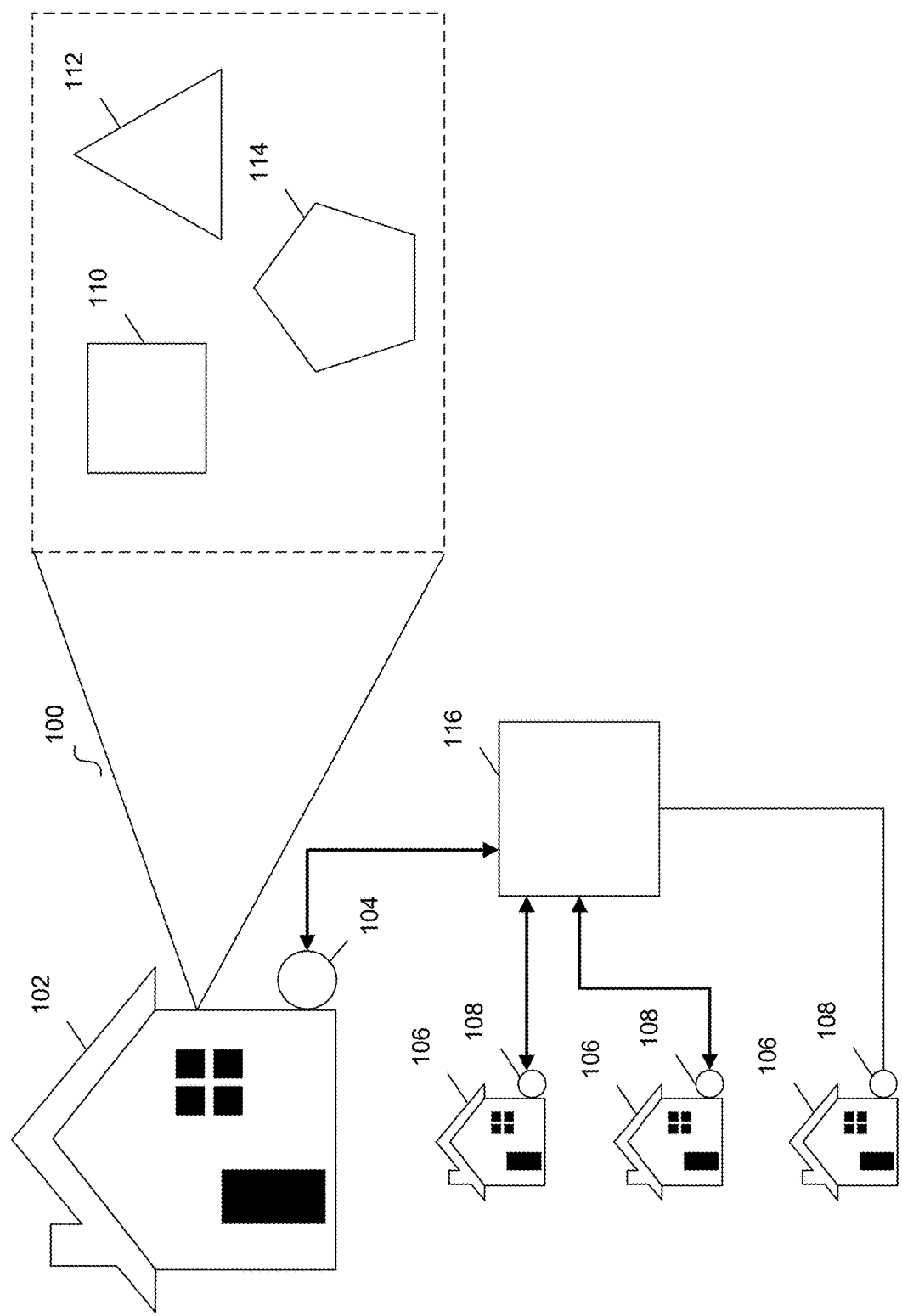
FIG. 1 illustrates a system for generating machine learning predictions to discover target device energy usage according to an example embodiment.

FIG. 1 illustrates a system for generating machine learning predictions to discover target device energy usage according to an example embodiment. System 100 includes source location 102, meter 104, source locations 106, meters 108, devices 110, 112, and 114, and network node 116. Source location 102 can be any suitable location that includes or is otherwise associated with devices that consume or produce energy, such as a household with devices 110, 112, and 114. In some embodiments, devices 110, 112, and 114 can be electrical appliances and/or electrical vehicles that use energy, such as a washer, dryer, air conditioner, heater, refrigerator, television, computing device, and the like. For example, source location 102 can be supplied with power (e.g., electricity), and devices 110, 112, and 114 can draw from the power supplied to source location 102. In some embodiments, source location 102 is a household and the power to the household is supplied from an electric power grid, a local power source (e.g., solar panels), a combination of these, or any other suitable source.

In some embodiments, meter 104 can be used to monitor the energy usage (e.g., electricity usage) at source location 102. For example, meter 104 can be a smart meter, an advanced metering infrastructure ("AMI") meter, an automatic meter reading ("AMR") meter, a simple energy usage meter, and the like. In some embodiments, meter 104 can transmit information about the energy usage at source location 102 to a central power system, a supplier, a third party, or any other suitable entity. For example, meter 104 can implement two-way communication with an entity in order to communicate the energy usage at source location 102. In some embodiments, meter 104 may implement one-way communication with an entity, where meter readings are transmitted to the entity.

In some embodiments, meter 104 can communicate over wired communication links and/or wireless communication links, and can leverage wireless communication protocols (e.g., cellular technology), Wi-Fi, wireless ad hoc networks over Wi-Fi, wireless mesh networks, low power long range wireless ("LoRa"), ZigBee, Wi-SUN, wireless local area networks, wired local area networks, and the like. Devices 110, 112, and 114 (and other devices not depicted) can use energy at source location 102, and meter 104 can monitor the energy usage for the source location and report the corresponding data (e.g., to network node 116).

In some embodiments, source locations 106 and meters 108 can be similar to source location 102 and meter 104. For example, networking node 116 can receive energy usage information about source location 102 and source locations 106 from meter 104 and meters 106. In some embodiments, network node 116 can be part of a central power system, a supplier, a power grid, an analytics service provider, a third-party entity, or any other suitable entity.

The following description includes recitations of a criterion or criteria. These terms are used interchangeably throughout the disclosure, the scope of criteria is intended to include the scope of criterion, and the scope of criterion is intended to include criteria.

Embodiments use the total energy usage from a household provided by metering infrastructure (e.g., advanced metering infrastructure (AMI), simple metering infrastructure, and the like) to accurately predict the presence of target device energy usage within household energy usage. The domain of non-intrusive load monitoring ("NILM") and other varieties of energy usage detection have drawn significant interest. Accurate device specific energy usage discovery (e.g., via NILM or NILM like techniques) provides many benefits including energy savings opportunities, personalization, improved electric grid planning, and more.

Embodiments utilize a deep learning scheme that can, based on limited training sets, accurately predict the presence of target device energy usage, such as energy usage from an electric vehicle or a household appliance. Accurate discovery can be challenging due to the variety of energy consuming devices, such as those in a common household (e.g., large electric appliances and electric vehicles) and their corresponding use conditions. In addition, in the NILM domain, the availability of training data can be limited. Therefore, learning schemes that can maximize the benefits of training datasets can be particularly effective. In embodiments, training data can be used to train learning models designed to effectively learn in these challenging conditions. Input to the learning models can be provided by AMI or non-AMI (e.g., simple infrastructure) along with other types of inputs. Embodiments can accurately predict target device energy usage presence from total energy usage in various granularity resolutions (e.g., 15 min, 30 min, 1 hour, and the like, or daily, weekly, monthly, and the like).

Conventional NILM implementations with existing learning schemes have their own shortcomings. Some of the proposed approaches previously considered are built on combinatorial optimization, Bayesian methods, Hidden Markov Models, or Deep Learning. However, many of these models are not useful in real world scenarios because they suffer from various drawbacks. For example, some of these solutions are computationally expensive, and thus impractical. Others require high resolution/granularity input (e.g., AMI data or training data) with specific circumstances that is often unavailable or impractical given deployed metering capabilities.

Embodiments achieve several benefits over these conventional approaches. For example, embodiments support higher levels of accuracy, which continue to improve over time with newer data. Embodiments also implement machine learning models with improved generalization. For example, some model implementations are trained on a large and diverse set of energy usage data obtained from a variety of different locations, and improved results are obtained across various geographic locations for these implementations.

Embodiments also improve resource and time efficiency for model training and performance. For example, some deep learning models may have extensive resource requirements for training/performance, and these requirements can equate to hundreds of thousands of dollars, and in some cases millions of dollars. Embodiments achieve efficient resource and compute times for model training and performance. In addition, model scoring is similarly achieved under efficient timing requirements. For example, scoring can be achieved in milliseconds in some embodiments.

Figure 2:
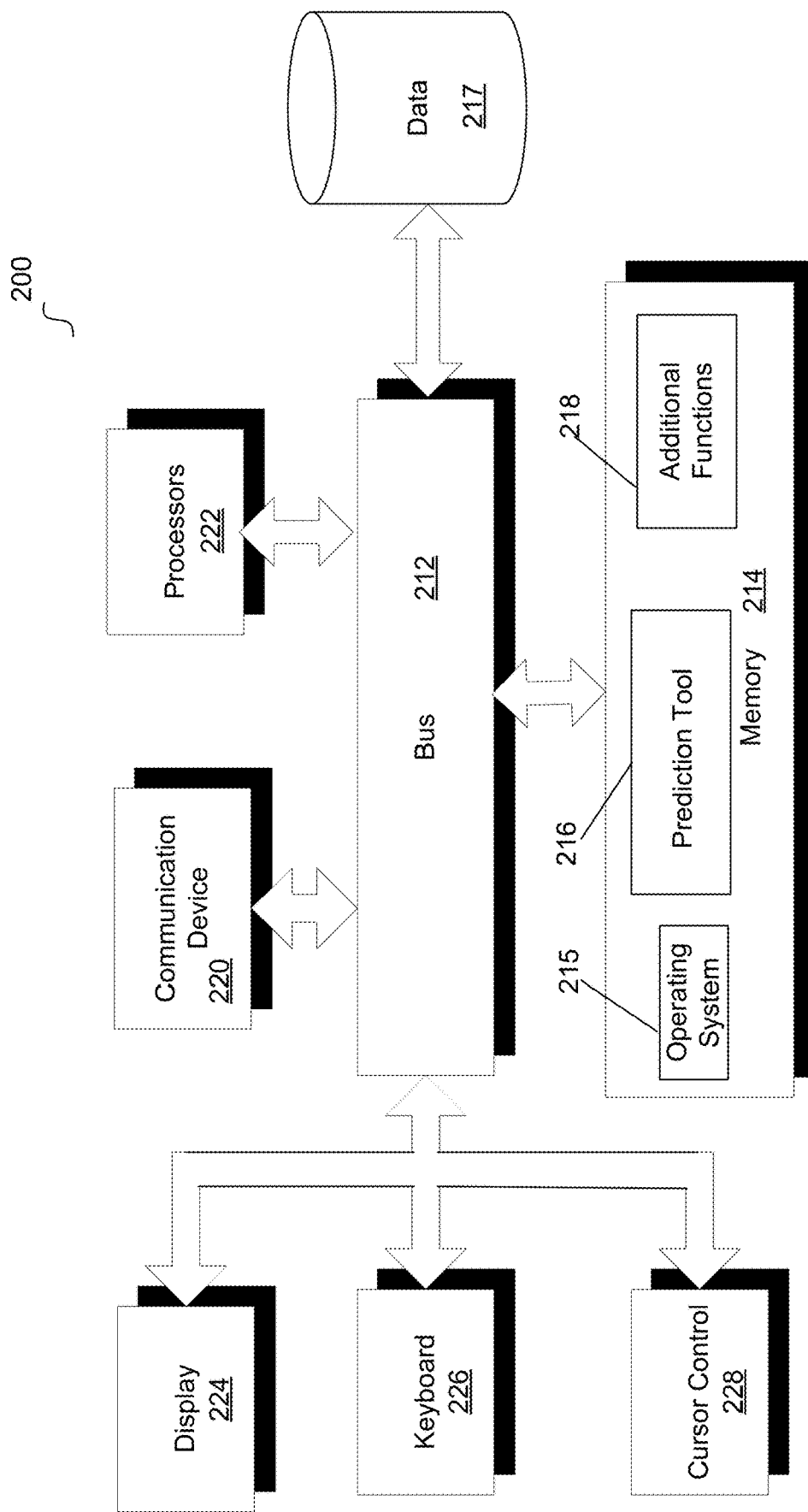
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, prediction tool 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, a prediction tool 216 that implements target device presence prediction functionality disclosed herein, as well as other applications modules 218. Operating system 215 provides operating system functionality for system 200. In some instances, prediction tool 216 may be implemented as an in-memory configuration. In some implementations, when system 200 executes the functionality of prediction tool 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Utilities Customer Cloud Service, Oracle® Cloud Infrastructure, Oracle® Cloud Platform, Oracle® Cloud Applications, for example. Prediction tool 216, other applications module 218, and any other suitable component of system 200 can include various modules of Oracle® Data Science Cloud Service, Oracle® Data Integration Service, or other suitable Oracle® products or services.

A database 217 is coupled to bus 212 to provide centralized storage for modules 216 and 218 and to store, for example, data received by prediction tool 216 or other data sources. Database 217 can store data in an integrated collection of logically related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Figure 3:
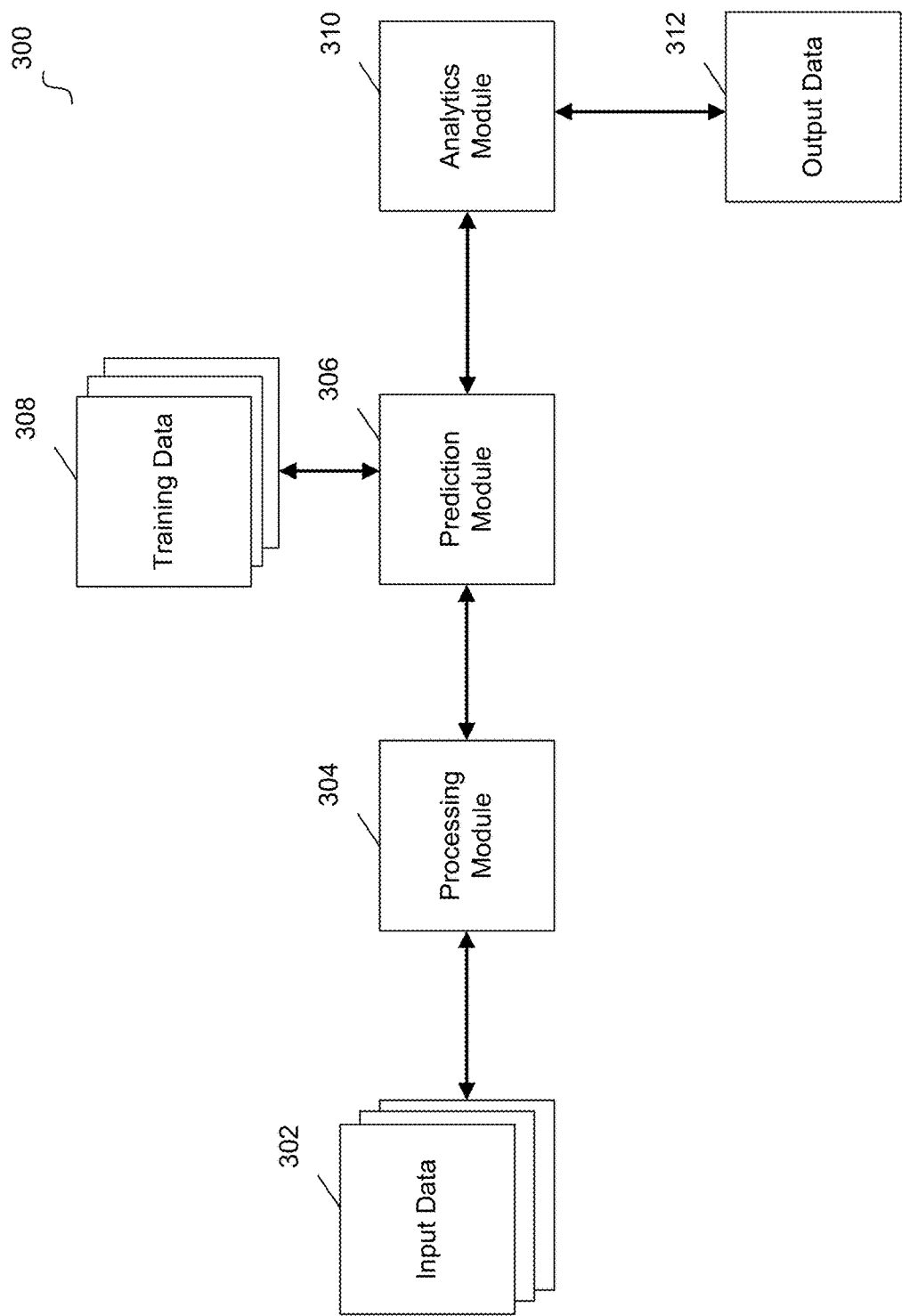
FIG. 3 illustrates an architecture for using a machine learning model to discover the presence of target device energy usage within household energy usage according to an example embodiment.

FIG. 3 illustrates an architecture for using a machine learning model to discover the presence of target device energy usage within household energy usage according to an example embodiment. System 300 includes input data 302, processing module 304, prediction module 306, training data 308, analytics module 310, and output data 312. In some embodiments, input data 302 can include energy usage from a source location, and the data can be processed by processing module 304. For example, processing module 304 can process input data 302 to generate features based on the input data.

In some embodiments, prediction module 306 can be a machine learning module (e.g., neural network) that is trained by training data 308. For example, training data 308 can include labeled data, such as energy usage data values from a plurality of source locations (e.g., source locations 102 and 106 from FIG. 1) that include labels that indicate the presence of target device energy usage. In some embodiments, the output from processing module 304, such as the processed input, can be fed as input to prediction module 306. Prediction module 306 can generate instances of target device presence predictions, such as multiple predictions over a period of time about the presence of target device energy usage within the overall source location energy usage.

In some embodiments, analytics module 310 can analyze the multiple instances of target device presence predictions. For example, a mathematical function can be used to combine the instances of the presence predictions to generate an overall prediction about whether source energy usage data measured over a period of time includes the presence of target device energy usage. In some embodiments, the overall predictions can be output data 312. For example, input data 302 can be source location energy usage data and output data 312 can be a prediction (e.g., confidence value) about the presence of target device energy usage within the source location energy usage data (e.g., over the period of time).

Embodiments use machine learning models, such as neural networks, to predict the presence of target device energy usage. Neural Networks can include multiple nodes called neurons that are connected to other neurons via links or synapses. Some implementations of neural networks can be aimed at classification tasks and/or can be trained under supervised learning techniques. In many cases, labeled data can include features that help in achieving a prediction task (e.g., energy usage classification/prediction). In some embodiments, neurons in a trained neural network can perform a small mathematical operation on given input data, where their corresponding weights (or relevance) can be used to produce an operand (e.g., produced in part by applying a non-linearity) to be passed further into the network or given as the output. A synapse can connect two neurons with a corresponding weight/relevance. In some embodiments, prediction module 306 from FIG. 3 can be a neural network.

In some embodiments, a neural network can be used to learn trends within labeled (or surveyed) energy usage data (e.g., household energy usage data values, over a period of time, labeled with either device specific energy usage or a general device label). For example, the training data can include features and these features can be used by a neural network (or other learning model) to identify trends and predict the presence of target device energy usage from overall source location energy usage. In some embodiments, once a model is trained/ready it can be deployed. Embodiments can be implemented with a number of products or services (e.g., Oracle® products or services).

In some embodiments, the design of prediction module 306 can include any suitable machine learning model components (e.g., a neural network, support vector machine, specialized regression model, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type.

Figure 4A:
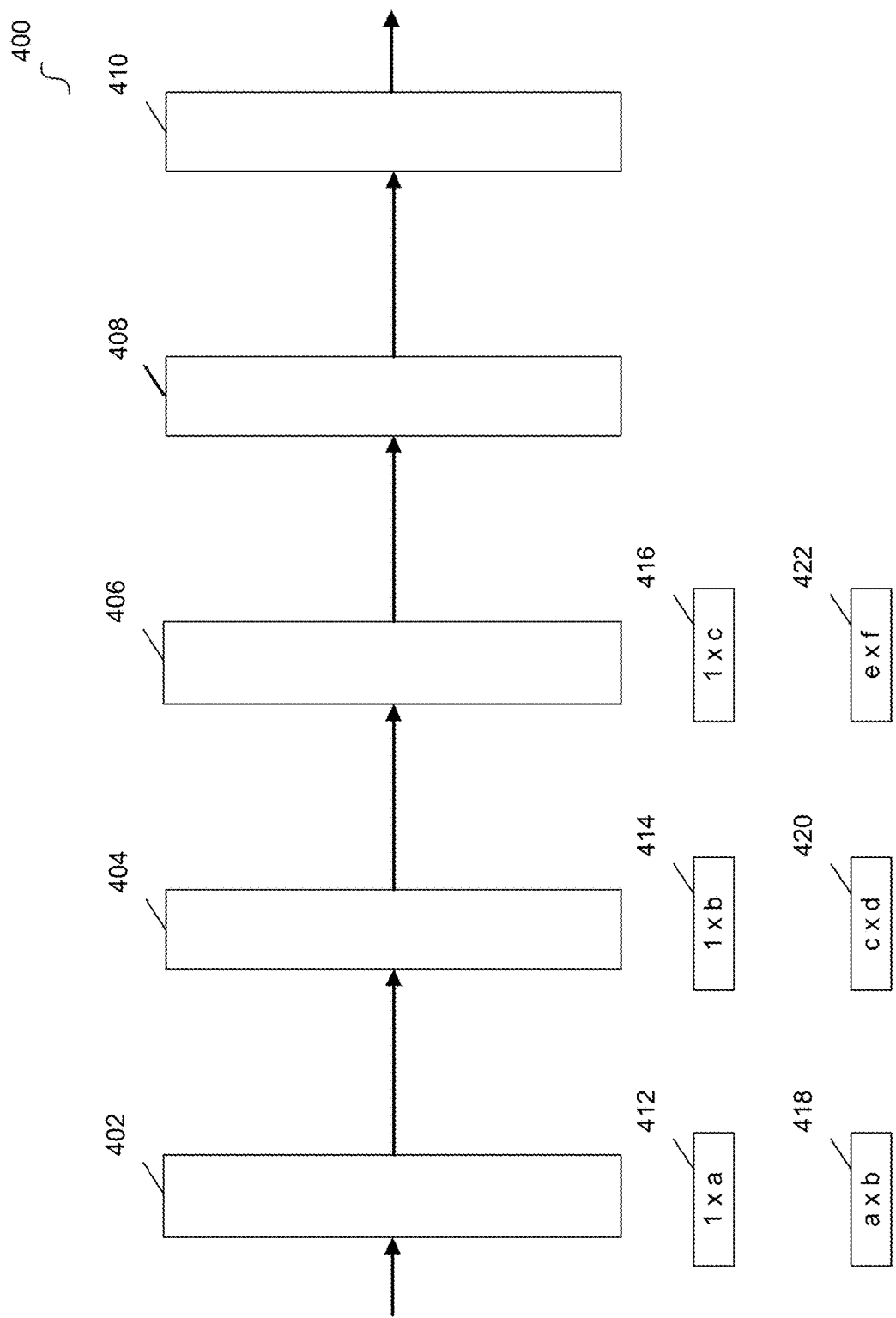
FIGS. 4A-4C illustrate sample neural networks according to example embodiments.
Figure 4B:
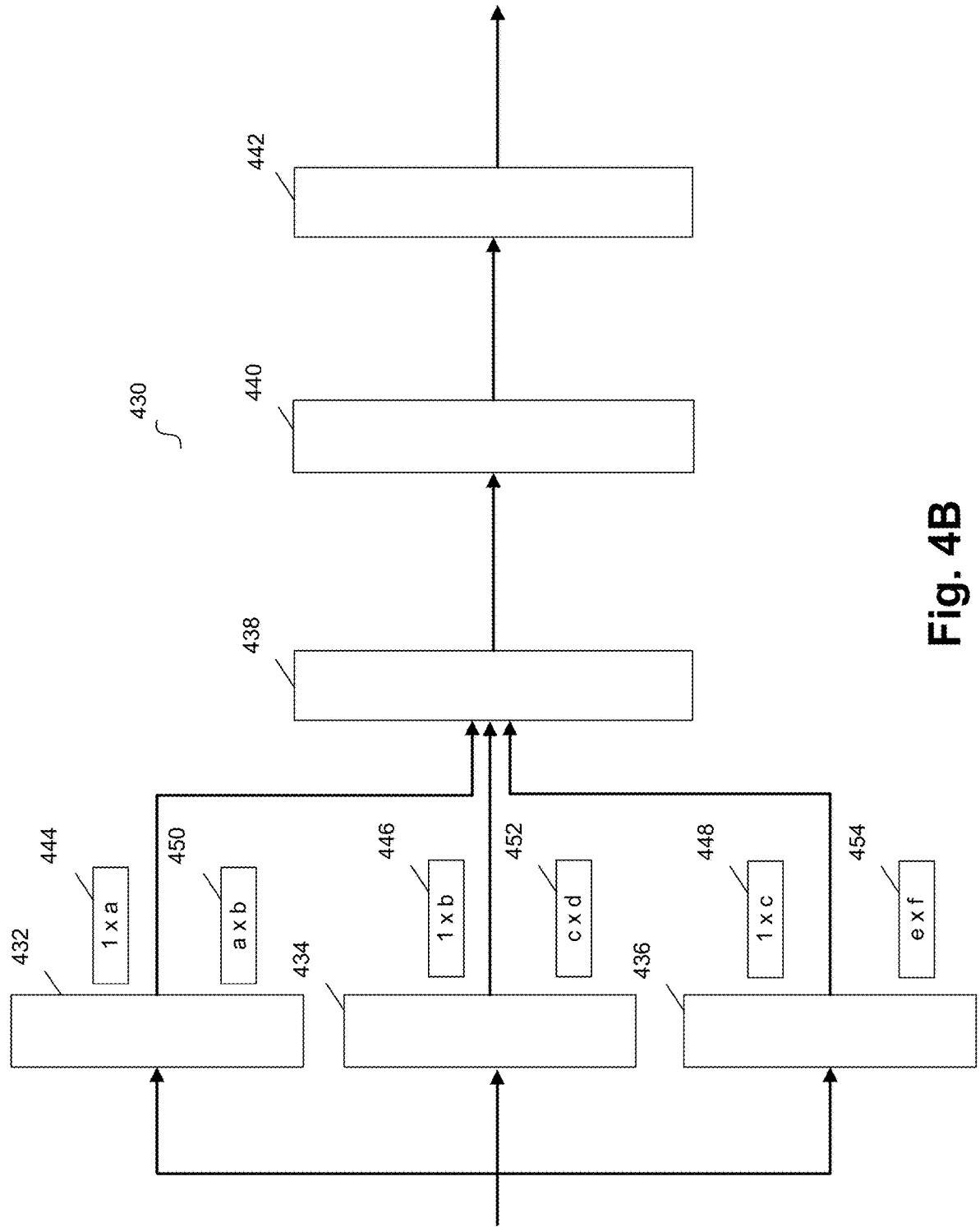
Figure 4C:
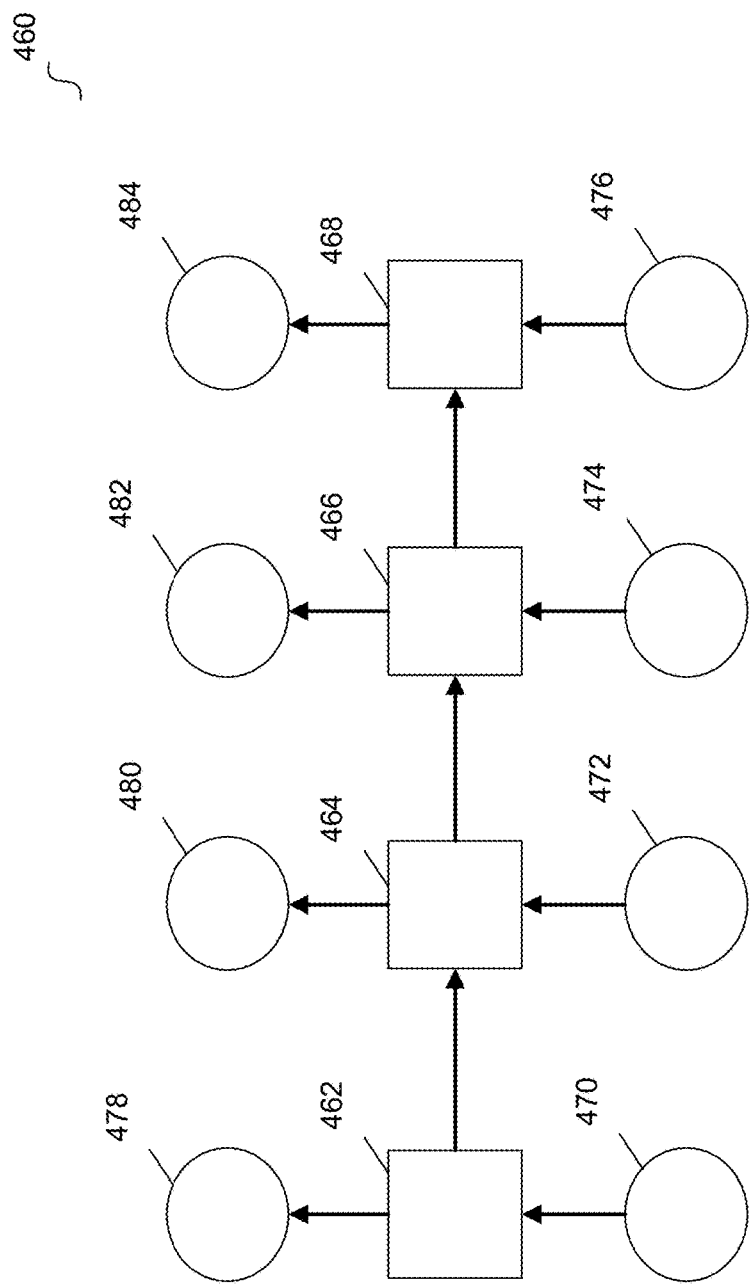

FIGS. 4A-4C illustrate sample neural networks according to example embodiments. Neural network 400 of FIG. 4A includes layers 402, 404, 406, 408, and 410. In some embodiments, neural network 400 can be a convolutional neural network with one or more of kernels 412, 414, 416, 418, 420, and 422. For example, at a given layer of a convolutional neural network, one or more filters or kernels can be applied to the input data of the layer. Kernels 412, 414, and 416 are illustrated as 1-dimensional kernels (e.g., 1×n) and kernels 418, 420, and 422 are illustrated as 2-dimensional kernels (e.g., n×m), but any other suitable shape can be implemented.

In some embodiments, layers 402, 404, and 406 are convolutional layers, kernel 412 is applied at layer 402, kernel 414 is applied at layer 404, and kernel 416 is applied at layer 406. In some embodiments, layers 402, 404, and 406 are convolutional layers, kernel 418 is applied at layer 402, kernel 420 is applied at layer 404, and kernel 422 is applied at layer 406. The shape of the data and the underlying data values can be changed from input to output depending on the shape of the applied filter or kernel (e.g., 1×1, 1×2, 1×3, 1×4, 2×1, 2×2, 2×3, 3×2, and the like), the manner in which the filter or kernel is applied (e.g., mathematical application), and other parameters (e.g., stride). In embodiments, kernels 412, 414, and 416 can have one consistent shape among them, two different shapes, or three different shapes (e.g., all the kernels are different sizes) and/or kernels 418, 420, and 422 can have one consistent shape among them, two different shapes, or three different shapes.

In some instances, the layers of a convolutional neural network can be heterogeneous and can include different mixes/sequences of convolution layers, pooling layers, fully connected layers (e.g., akin to applying a 1×1 filter), and the like.

In some embodiments, layers 408 and 410 can be fully connected layers. Accordingly, embodiments of neutral network 400 illustrate a feed forward convolutional neural network with a number of convolution layers (e.g., implementing one or more dimensions of filters or kernels) followed by fully connected layers. Embodiments can implement any other suitable convolutional neural networks.

Neural network 430 of FIG. 4B includes layers 432, 434, 436, 438, 440, and 442, as well as kernels 444, 446, 448, 450, 452, and 454. Neural network 430 can be similar to neural network 400 of FIG. 4A, however layers 432, 434, and 436 can be convolutional layers with a parallel orientation in some embodiments, and layer 438 can be a concatenation layer that concatenates the output of layers 432, 434, and 436. For example, the input from an input layer can be fed into each of layers 432, 434, and 436, where the output from these layers is concatenated at layer 438.

In some embodiments, kernels 444, 446, and 448 can be similar to kernels 412, 414, and 416 of FIG. 4A and kernels 450, 452, and 454 can be similar to kernels 418, 420, and 422 of FIG. 4A. For example, kernels 444, 446, and 448 are illustrated as 1-dimensional kernels and kernels 450, 452, and 454 are illustrated as 2-dimensional kernels, but any other suitable shape can be implemented. In embodiments, kernels 444, 446, and 448 can have one consistent shape among them, two different shapes, or three different shapes (e.g., all the kernels are different sizes) and/or kernels 450, 452, and 454 can have one consistent shape among them, two different shapes, or three different shapes.

In some instances, the layers of a convolutional neural network can be heterogeneous and can include different mixes/sequences of convolution layers, pooling layers, fully connected, parallel layers, concatenation layers, and the like. For example, layers 432, 434, and 436 can represent three parallel layers, however a larger or smaller number of parallel layers can be implemented. Similarly, the output from each of layers 432, 434, and 436 is depicted as input to layer 438, which is a concatenation layer in some embodiments, however one or more of layers 432, 434, and 436 can include additional convolutional or other layers prior to a concatenation layer. For example, one or more convolutional or other layers can be present between layer 432 (e.g., a convolutional layer) and layer 438 (e.g., a concatenation layer). In some embodiments, another convolutional layer (with another kernel) can be implemented between layer 432 and 438 while no such intervening layer is implemented for layer 434. In other words, in this example an input to layer 432 can pass through another convolutional layer prior to being input to layer 438 (e.g., a concatenation layer) while an input to layer 434 is output directly to layer 438 (without another convolutional layer).

In some embodiments, layers 432, 434, 436, and 438 (e.g., three parallel convolutional layers and a concatenation layer) can represent a block within neural network 430, and one or more additional blocks can be implemented before or after the depicted block. For example, a block can be characterized by at least two parallel convolutional layers followed by a concatenation layer. In some embodiments, a number of additional convolutional layers (e.g., more than two) with various parallel structures can be implemented as a block. Neural network 430 illustrates an embodiment of a feed forward convolutional neural network with a number of convolution layers (e.g., implementing 1-dimensional and/or 2-dimensional filters or kernels) with a parallel orientation followed by fully connected layers. Embodiments can implement any other suitable convolutional neural networks.

In some embodiments, the layers of neural networks 400 and 430 may be any other suitable neural network layers (e.g., layers that do not implement a convolutional kernel). For example, a mix of layers can be implemented in a neural network in some embodiments, where convolutional layers and/or convolutional neutral networks and/or convolutional blocks are implemented with other layers, networks, or blocks.

FIG. 4C depicts neural network 460, which can include blocks 462, 464, 466, and 468. In some embodiments, neural network 460 can be a recurrent neural network ("RNN"). For example, inputs 470, 472, 474, and 476 can represent an input sequence into neural network 460 (e.g., energy usage data as a sequence over time) and outputs 478, 480, 482 and 484 can represent an output sequence. In some embodiments, blocks 462, 464, 466, and 468 can be any suitable recurrent neural network block, such as a Long Short-Term Memory ("LSTM") block, a Gated Recurrent Unit ("GRU") block, a block of a second order RNN, a simple recurrent network block, a block with suitable weight matrices (e.g., weight matrix for input, weight matrix for calculation of hidden state, and weight matrix for calculation of output), a block with any suitable combination of weight matrices, activation functions, and/or gates, and the like.

In some embodiments, the blocks of neural network 460 pass a hidden state (or multiple hidden state values) when processing a sequence of input. For example, block 462 can calculate output 478 and a hidden state that is passed to block 464. Similarly, block 464 can calculate output 480 and a hidden state that is passed to block 466, and so on. In some embodiments, neural network 460 can include several more blocks (e.g., more than five) and include several more layers (e.g., more than one layer of blocks). In some embodiments, neural network 460 can be a bi-directional neural network (e.g., a hidden state is passed forward and backward among the blocks).

Embodiments implement a neural network that includes a heterogenous mix of architectures. For example, an implemented neural network may include layers of a CNN combined with layers of an RNN. In some embodiments, a CNN architecture (e.g., serial convolutional layers, parallel convolutional layers and/or concatenation layers, pooling layers, fully connected layers, and the like) is combined with an RNN architecture (e.g., blocks of an RNN neural network) such that the output from the CNN architecture serves as input to the RNN architecture. For example, input data (e.g., energy usage data as a sequence over time) may be processed by the CNN architecture, output from the CNN architecture can be input from the RNN architecture, and the RNN architecture may process its input data to generate a prediction result. In some embodiments, one or more fully connected layers (with a suitable activation function) can follow the CNN architecture, RNN architecture, or both. Other implementations can include other stacks of neutral network architectures, layers, and/or other suitable orientation of neutral network components.

In some embodiments, the neural network can be configured for deep learning, for example based on the number of neural network layers implemented. In some examples, a Bayesian network can be similarly implemented, or other types of supervised learning models. For example, a support vector machine can be implemented, in some instances along with one or more kernels (e.g., gaussian kernel, linear kernel, and the like).

In some embodiments, testing instances can be given to the model to calculate its accuracy. For example, referring back to FIG. 3, a portion of training data 308/labeled or surveyed energy usage data can be reserved for testing the trained model (e.g., rather than training the model). The accuracy measurement can be used to tune prediction module 306. In some embodiments, accuracy assessment can be based on a subset of the training data/processed data. For example, a subset of the data can be used to assess the accuracy of a trained model (e.g., a 75% to 25% ratio for training to testing, and the like). In some embodiments, the data can be randomly selected for the testing and training segments over various iterations of the testing.

In some embodiments, when testing, the trained model can output a prediction (e.g., confidence value, such as a number between 0 and 1) that indicates the presence of target device energy usage within the given input (e.g., instance of testing data). For example, an instance of testing data can be energy usage data for a given source location (e.g., household) over a period of time that includes a label that indicates whether the target device energy usage is present. Because the presence of target device energy usage is known for the given input/testing instance, the predicted value can be compared to the known value to generate an accuracy metric. Based on testing the trained model using multiple instances of testing data, an accuracy for the trained model can be assessed.

In some embodiments, the design of prediction module 306 can be tuned based on accuracy calculations during training, retraining, and/or updated training. For example, tuning can include adjusting a number of hidden layers in a neural network, adjusting a kernel calculation (e.g., used to implement a support vector machine or neural network), and the like. This tuning can also include adjusting/selecting features used by the machine learning model, adjustments to the processing of input data, and the like. Embodiments include implementing various tuning configurations (e.g., different versions of the machine learning model and features) while training/calculating accuracy in order to arrive at a configuration for prediction module 306 that, when trained, achieves desired performance (e.g., performs predictions at a desired level of accuracy, runs according to desired resource utilization/time metrics, and the like). In some embodiments, the trained model can be saved or stored for further use and for preserving its state. For example, the training of prediction module 306 can be performed "offline" and the trained model can then be stored and used as needed to achieve time and resource efficient data prediction.

Embodiments of prediction module 306 are trained to identify the presence of target device energy usage within overall source location (e.g., household) energy usage data based on processed training data. An example of energy usage data that can be processed to generate training data 308 includes:

TABLE 1

Pre-processed Source Location Energy Usage Data

| Id | Time | Total | AC | EV | Refrigerator | ... |
|---|---|---|---|---|---|---|
| 1 | 2019-06-01 00:00:00 | 0.91 | 0.33 | 0.0 | 0.02 | |

TABLE 1-continued

Pre-processed Source Location Energy Usage Data

| Id | Time | Total | AC | EV | Refrigerator | ... |
|---|---|---|---|---|---|---|
| 2 | 2019-06-01 00:00:15 | 3.52 | 0.41 | 2.91 | 0.06 | |
| 3 | 2019-06-01 00:00:30 | 3.95 | 0.0 | 3.33 | 0.11 | |
| 4 | 2019-06-01 00:00:45 | 3.26 | 0.0 | 2.83 | 0.11 | |
| 5 | 2019-06-01 01:00:00 | 0.86 | 0.0 | 0.58 | 0.14 | |
| 6 | 2019-06-01 01:00:15 | 0.55 | 0.0 | 0.0 | 0.18 | |
| 7 | 2019-06-01 01:00:30 | 0.67 | 0.0 | 0.0 | 0.09 | |
| 8 | 2019-06-01 01:00:45 | 0.52 | 0.0 | 0.0 | 0.04 | |
| 9 | 2019-06-01 02:00:00 | 0.44 | 0.0 | 0.0 | 0.02 | |
| 10 | 2019-06-01 02:00:15 | 0.63 | 0.0 | 0.0 | 0.03 | |

A sample row of this example data includes the columns: identifier, timestamp, total (energy usage), and labeled device specific energy usage (e.g., air conditioner, electric vehicle, refrigerator, and the like). This example includes a granularity of 15 minutes, but other suitable granularities can similarly be implemented (e.g., 1 min, 5 mins, 30 mins, 1 hour, hours, a day, days, a week, weeks, a month, and the like). In some embodiments, processing the energy usage data (e.g., to generate training data 308) can include reducing a granularity of the data, for example so that it can be used to generate a training corpus with a consistent granularity (e.g., 1 hour, 1 day, 1 week, 1 month, and the like). Such granularity reduction can be achieved by summing the data usage values over the components that make up a unit of time (e.g., summing the data usage values over the 4 15-minute intervals that make up an hour).

Embodiments include a target device (e.g., electric vehicle) and/or a set of target devices to be included within training data 308. For example, the training of prediction module 306 can be configured to identify the presence of target device energy usage within overall energy usage, and the training data can include labeled data usage for a sole target device or multiple target devices.

Embodiments include a set of devices to be included within training data 308. For example, the training of prediction module 306 can be configured to generate target device discovery predictions, however the training can utilize labeled data usage for a set of other devices in addition to the target device. In some embodiments, the set of other devices can be based on the energy usage data and/or device specific labeled data values available for training purposes. Training data is often limited, and therefore training techniques that leverage the available training data are often beneficial. In some embodiments, the set of other devices used within the training techniques can be based on device diversity within available training data, the different combinations of devices at given source locations, and/or the frequency of appearance for different combinations of devices within available training data.

In some embodiments, pre-processing data can include selecting, from Table 1, a subset of columns, a subset of rows, an aggregation (or some other mathematical/combinatorial function) of data, and other suitable processing. For example, data cleaning, normalization, scaling, or other processing used to render the data suitable for machine learning can be performed. In some embodiments, training data can include labeled data (e.g., target device labeled data with metered energy usage) and surveyed data (e.g., target device labeled data without metered energy usage). For example, labeled data can include total energy usage data at a source location as well as labeled energy usage data for the target device.

Surveyed data can include an indication of the presence of the target device (e.g., at the source location), such as indicated through a survey at a particular date. In some embodiments, survey responses about the target device can be associated with a temporal property (e.g., response date to the survey) and with a given source location (e.g., household) such that the surveyed data is represented by total energy usage at the given source location proximate to the temporal property with a general label that the data includes target device energy usage (rather than with specific target device energy usage values). In certain implementations, labeled energy usage data is highly useful but scare. Accordingly, surveyed energy usage data can be combined with labeled energy usage data to bolster the performance of the training machine learning model. For example, bolstering labeled energy usage data with surveyed energy usage data can improve general performance of the model and lead to more accurate results.

In some embodiments, input 302 and/or training data 308 can include information other than energy usage information. For example, weather information relative to the energy usage data (e.g., the weather at the time the energy usage was measured, such as precipitation, temperature, and the like), calendar information relative to the energy usage data (e.g., calendar information at the time the energy usage was measured, such as month, date, day of week, and the like), a time stamp relative to the energy usage data, and other relevant information can be included in input 302 and/or training data 308. For example, the other relevant information associated with an instance of source location energy usage data (e.g., over a day, a week, a month, or any other predetermined duration of energy usage data) can include average temperate, minimum temperature, maximum temperature, average dew point, minimum dew point, and/or maximum dew point.

Embodiments process energy usage data from source locations (e.g., households) to generate the training data 308 that is used to train prediction module 306. For example, the overall source location energy usage data values can be combined with labeled energy usage data values for one or more target devices (and in some implementations, surveyed energy usage data), and this resultant combination can be processed to arrive at training data 308. In some embodiments, the energy usage data for source locations can be obtained via measurement (e.g., metering). In addition, measurement, metering, or some other technique for receiving/monitoring energy usage for specific devices within the source location can be implemented to generate the device specific labeled energy usage data for training. In other examples, energy usage data that includes source location energy usage and disaggregated target device specific energy within the source location can be obtained from a third party. For example, training data can be obtained in any suitable manner, such as by monitoring source locations (e.g., households) in known circumstances, obtaining data sets publicly (or otherwise) available, developing a joint venture or partnership that results in the training data, and through any other suitable means.

In some embodiments, multiple instances of source location energy usage data (e.g., that each cover a predetermined duration of time) can be input to trained prediction module 306 such that multiple predictions (e.g., a prediction for each instance) can be generated. For example, an instance of input data fed into trained prediction module 306 can be a week (or a month) of source location energy usage data (e.g., along with other relevant associated information, such as weather, calendar, and the like), and a prediction (e.g., confidence data value between 0 and 1, or any other suitable numeric range) can be generated that indicates the presence of target device energy usage within the source location energy usage (e.g., over the week, or other suitable duration of time). In some embodiments, an instance of source location energy usage data can be broken into a given granularity (e.g., 15 minute, 30 minute, hourly, multiple hours, daily, multiple days, weekly, monthly, and the like) over the duration of time (e.g., week or month). In other embodiments, the instance of source location energy usage data can have a single data value (or few data values) for the entire duration of time (e.g., energy usage data value that corresponds to a monthly bill).

In some embodiments, prediction module 306 can be fed these multiple instances of input data (e.g., multiple weeks or months) such that multiple instances of presence predictions (confidence data values) are generated. For example, analytics module 310 can combine the instances of the presence predictions to generate an overall prediction about whether source energy usage data measured over a period of time (e.g., the period of time that spans, or is otherwise associated with, the multiple instances of input data used to generate the instances of presence predictions) includes the presence of target device energy usage. In some embodiments, a mathematical function can be used to combine the instances of the presence predictions to generate an overall prediction about whether source location energy usage data measured over the period of time includes the presence of target device energy usage. For example, the instances of presence predictions can be data values between a given range (e.g., between 0 and 1) and the combining can include an average, minimum, maximum, k-max average, a combination of these, and any other suitable combination technique.

In some embodiments, the combined data value can represent the overall prediction for the presence of target device energy usage over the period of time (e.g., using a value within a predetermined range, such as 0 to 1), and can be output as output data 312. For example, input data 302 can be multiple instances of source location energy usage data that span a period of time (e.g., multiple weeks of data that span a few or several months) and output data 312 can be an overall prediction (e.g., confidence data value) that combines multiple instances of presence predictions, where the overall prediction indicates the presence of target device energy usage within the source location energy usage data over the period of time.

Figure 5A:
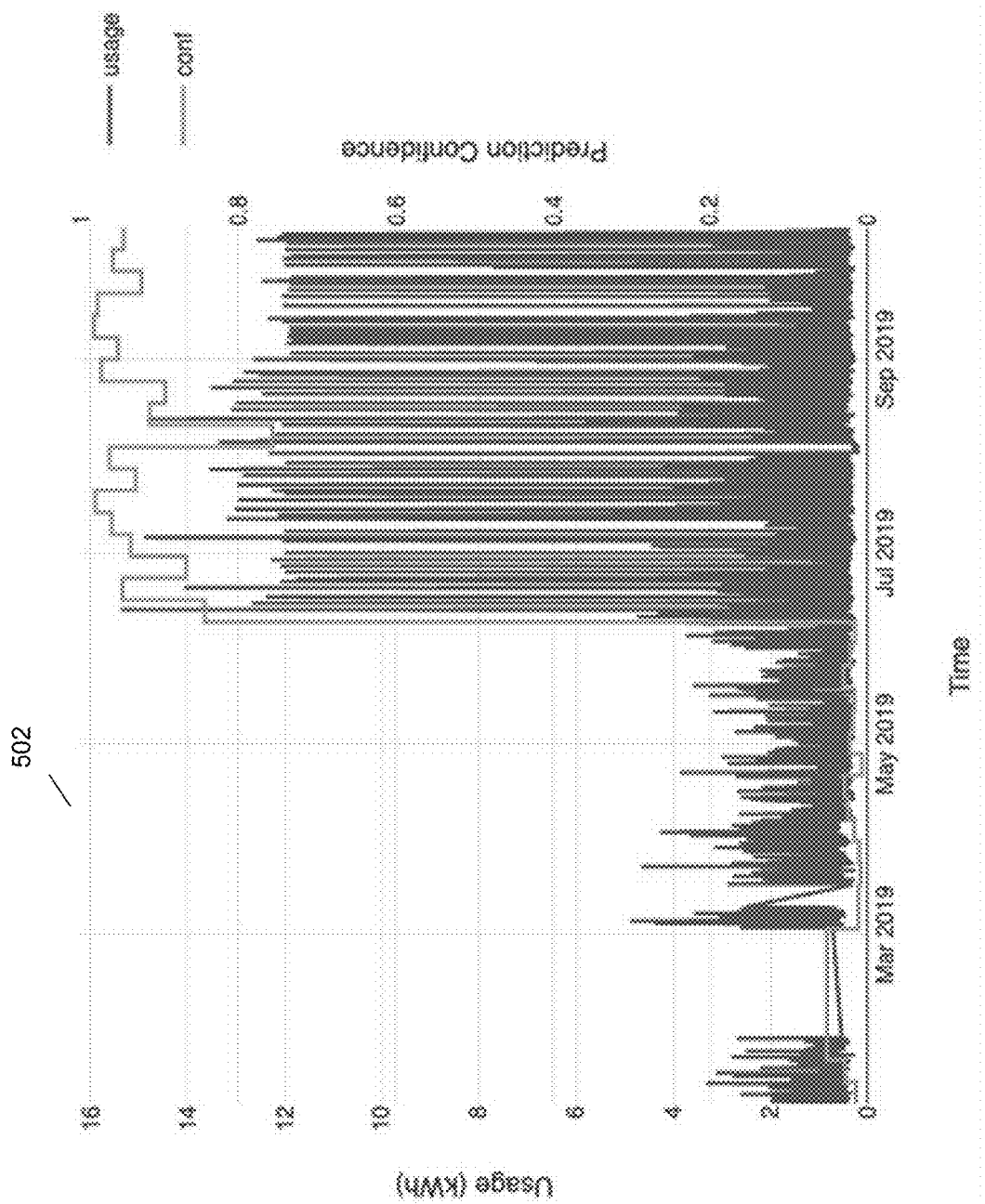
FIGS. 5A-5B illustrate sample graphs that represent device specific energy usage presence prediction results and accuracy according to example embodiments.
Figure 5B:
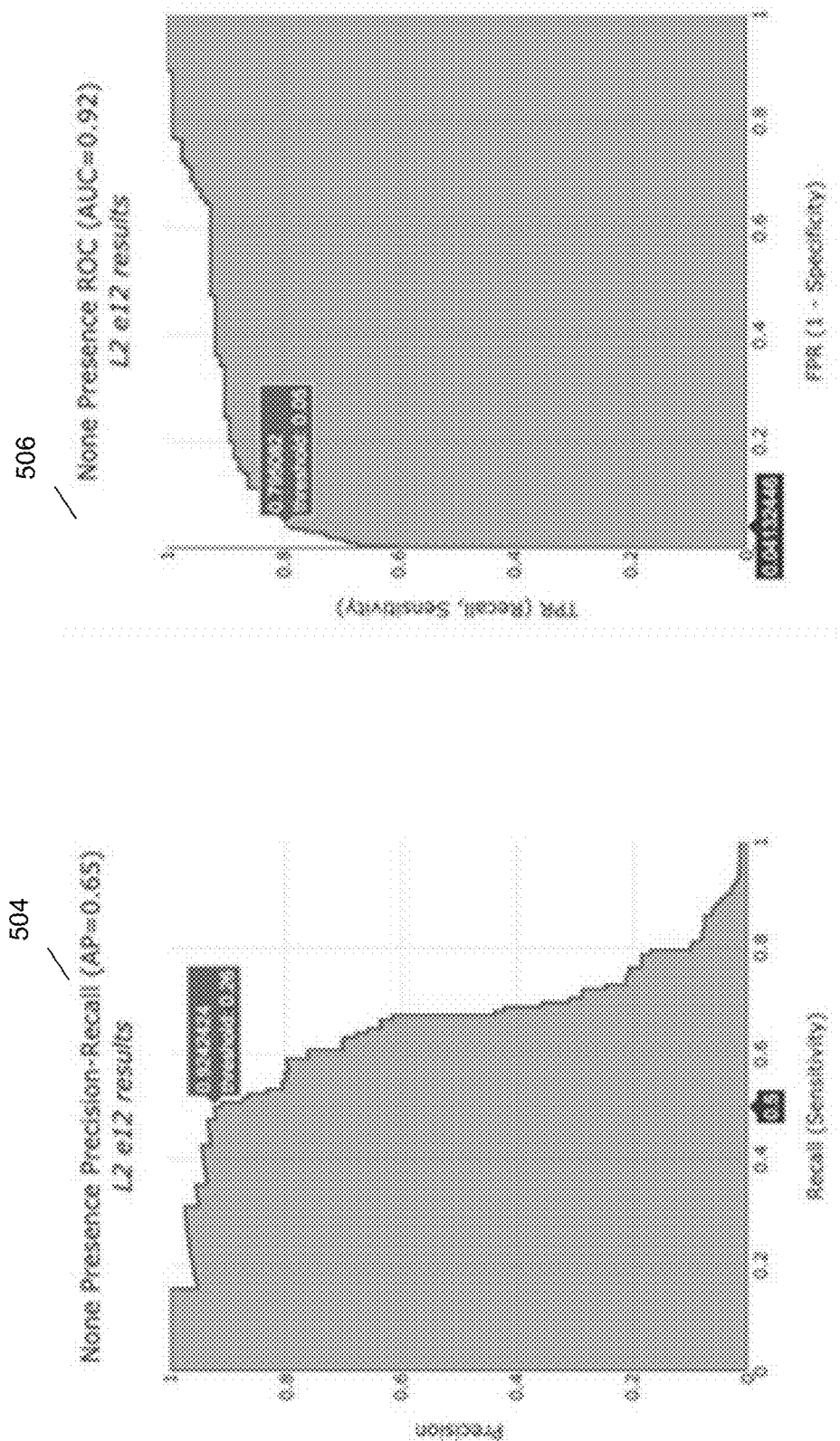

In some embodiments, the output data 312 can be compared to a criteria or threshold (e.g., configurable threshold) to determine whether the overall prediction is a positive (e.g., that the source location energy usage data includes target device energy usage) or a negative (e.g., that the source location energy usage data does not include target device energy usage). FIGS. 5A-5B illustrate sample graphs that represent device specific energy usage presence prediction results according to example embodiments. The data depicted in the sample graphs represents tested embodiments disclosed herein for predicting the presence of target device energy from total energy usage at an unseen source location (e.g., household). FIG. 5A depicts a graphical representation of total energy usage data and a predicted confidence data value of the presence of target device energy usage according to some embodiments. In graph 502, time is represented on the x-axis while energy usage (in kWh) is represented on the y-axis.

With reference to FIG. 5A, the trained prediction model can receive (as input) the total energy usage data values (e.g., processed input data) and generate the graphically represented predictions (e.g., confidence value that the energy usage data includes target device energy usage). The total energy usage data values that serve as input data can include energy by a plurality of devices, which can sometimes include the target device(s). In some embodiments, the presence predictions depicted in graph 502 can be instances of presence predictions based on instances of input data (e.g., energy usage data over a predetermined duration of time, such as a week).

Graph 502 depicts that the trained prediction model begins to predict a high confidence value around June 2019. In other words, around June 2019 (and thereafter) the trained prediction models positively discover the presence of target device energy usage within the overall source location energy usage. Some embodiments of the predicted confidence values for the target device achieve a high degree of accuracy over multiple weeks of time and other embodiments achieve a high degree of accuracy over multiple months of time, for example depending on the granularity of the input/training data. Any other suitable data granularities, periods of time, or other suitable parameters can be implemented.

Embodiments implement a threshold confidence data value that indicates the presence of target device energy usage. For example, FIG. 5A demonstrates first output confidence data values prior to June 2019 and second output confidence data values after June 2019, where the first output confidence data values do not indicate the presence of target device energy usage and the second output confidence data values indicate the presence of target device energy usage. Some embodiments utilize a criteria or threshold, where any confidence value greater than the threshold is indicative of a positive prediction for presence of target device energy usage.

FIG. 5B illustrates graphical output data generated by a trained prediction model according to some embodiments. For example, graph 504 is a precision-recall curve for the output from a trained prediction model and graph 506 is a receiver operator characteristic ("ROC") curve for the output from a trained prediction model. Graphs 504 and 506 illustrate the accuracy of these outputs based on true positives ("TP"), false positives ("FP"), true negatives ("TN"), and/or false negatives ("FN"). Graph 504 plots recall (e.g., TP/(TP+FN)) on the x-axis and precision (e.g., TP/(TP+FP)) on the y-axis while graph 506 plots False Positive Rate (e.g., FP/(FP+TN)) on the x-axis and True Positive Rate (e.g., TP/(TP+FN)) on the y-axis. In some embodiments, a threshold can be configured based on the accuracy relationships depicted in graphs 504 and/or 506.

Some embodiments implement a flexible criteria that can include multiple thresholds based on objective and use case. For example, a "high precision" use case has a relatively higher threshold that is computed empirically (e.g., based on the output data from a trained model achieving high precision) while a "high reach" use case has a relatively lower threshold that is computed empirically (e.g., based on the output data from a trained model balancing precision with a number of source locations captured by the threshold). Other objectives and/or use cases and corresponding thresholds that aim to optimize these objectives/use cases can similarly be implemented. In some embodiments, a threshold value can be derived using precision-recall values for trained model, ROC values for a trained model, a combination of these, or any other suitable technique can be used to calculate a threshold value (or threshold values).

Figure 6:
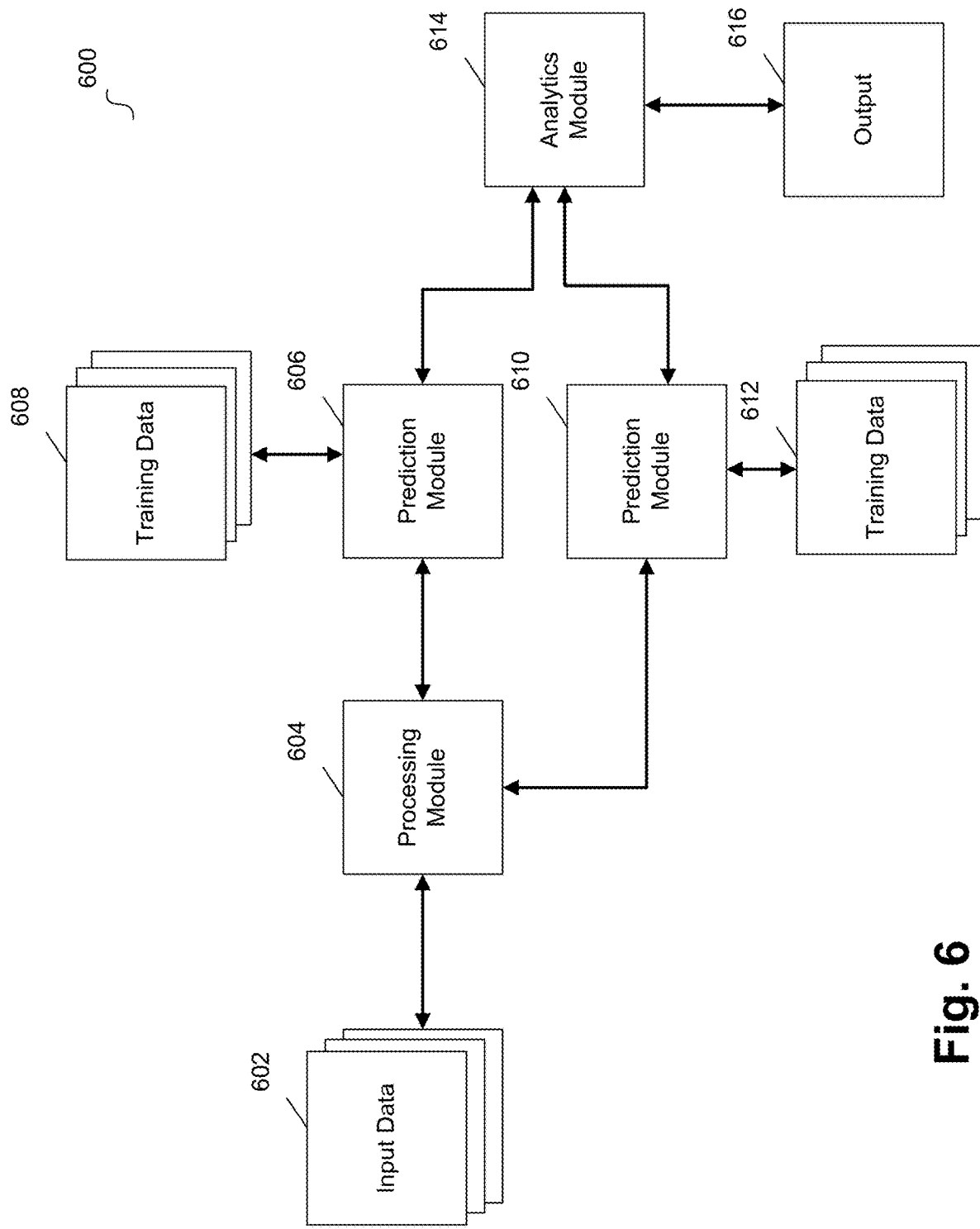
FIG. 6 illustrates an architecture for using multiple machine learning models to discover the presence of target device energy usage within household energy usage according to an example embodiment.

In some embodiments, multiple machine learning models can be trained, and the outputs of these models can be combined to achieve target device presence prediction. FIG. 6 illustrates an architecture for using multiple machine learning models to discover the presence of target device energy usage within household energy usage according to an example embodiment.

System 600 includes input data 602, processing module 604, prediction modules 606 and 610, training data 608 and 612, analytics module 614, and output 616. In some embodiments, input data 602 can include energy usage from a source location, and the data can be processed by processing module 604. For example, processing module 604 can process input data 602 to generate features based on the input data. In some embodiments, input data 602 and processing module 604 can be similar to input data 302 and processing module 304 of FIG. 3

In some embodiments, prediction modules 606 and 610 can be machine learning modules (e.g., neural networks) that are trained by training data 608 and 612, respectively. For example, training data 608 and 612 can include labeled data, such as energy usage data values from a plurality of source locations (e.g., source locations 102 and 106 from FIG. 1) that include labeled target device specific energy usage data values and/or target device surveyed energy usage data. The output from processing module 604, such as the processed input, can be fed as input to prediction modules 606 and 610. Embodiments of predictions modules 606 and 610 can be similar to prediction module 306 of FIG. 3.

In some embodiments, training data 608 and 612 can train prediction modules 606 and 610 to predict the presence of target device energy usage from overall source location energy usage. Once trained, prediction modules 606 and 610 may be configured for different varieties of target device presence prediction. For example, training data 608 can train prediction module 606 to discover the presence of a target device given a first set of input data, such as source location energy usage data with a first granularity (e.g., hourly granularity in weekly chunks) while training data 612 can train prediction module 610 to discover the presence of a target device given a second set of input data, such as source location energy usage data with a second granularity (e.g., monthly granularity with a single or few data values). In some embodiments, prediction module 606 can be configured to discover a first variety of target device energy usage (e.g., one or a set of target devices, a particular type of energy usage of a target device, and the like) and prediction module 610 can be configured to discover a second variety of target device energy usage.

In some embodiments, prediction module 606 can generate multiple instances of first target device presence predictions based on input data 602 and/or prediction module 610 can generate multiple instances of second target device presence predictions based on input data 602. These predictions from prediction modules 606 and 610 can be input to analytics module 614, which can generate one or more target device prediction(s) as output data 616.

In some embodiments, analytics module 614 can be similar to analytics module 310. For example, analytics module 614 can combine multiple instances of presence predictions from either or both of prediction modules 606 and 610 to generate an overall presence prediction. In some embodiments, prediction module 606 is trained to predict the presence of a first variety of target devices, prediction module 610 is trained to predict the presence of a second variety of target devices, and analytics module 614 combines these predictions from each module to arrive at an overall presence prediction. For example, input data 602 can be overall energy usage data from a source location that is processed by processing module 604 and fed into trained prediction module 606 and trained prediction module 610.

In some embodiments, each prediction module can generate multiple instances of presence predictions (e.g., confidence data values) that are combined by analytics module 614. Output 616 can be a single confidence data value that indicates the presence of a target device or multiple confidence data values that indicate the presence of different target devices. For example, the instances of presence predictions from prediction module 606 can be combined by analytics module 614 to arrive at a confidence data value for a first target device and the instances of presence predictions from prediction module 610 can be combined by analytics module 614 to arrive at a confidence data value for a second target device. In some embodiments, the instances of presence predictions from prediction modules 606 and 610 can be both combined by analytics module 614 to arrive at a confidence data value for a target device.

Embodiments realize several next level advantages that provide further enhancements to target device presence predictions. For example, embodiments that implement a flexible threshold can be optimized for precision, reach, a combination of these, or for any other suitable use case. Some embodiments can accept a variety of different types of input data/training data. For example, a given trained prediction model can be configured to utilize energy usage data at a first granularity (e.g., hourly granularity using weekly chunks) while another trained prediction model can be configured to utilize energy usage data at a second granularity (e.g., monthly chunks of data with a monthly or weekly granularity). These embodiments are configured to utilize high resolution data when available, thus optimizing predictions using the best available data, and to utilize lower resolution data when high resolution data is not available, thus providing a robust solution that works under a variety of conditions.

Embodiments can also be configured to discover the presence of energy usage from a variety of target devices. For example, using one or more trained predictions models, embodiments can discover the presence of energy usage (within overall source location energy usage) for the following target devices:

Battery Electric Vehicles (L1 standard and L2 fast charging: 120-V and 240-V)
Plug-in Hybrid Electric Vehicles (L1 standard and L2 fast charging: 120-V and 240-V)
Water Heaters
Washers
Dryers
Pool Pumps
Electric Heating
Electric Cooling
Heating, Ventilation, and Air Conditioning (HVAC) Devices
Photovoltaic/Solar Panels Embodiments are also highly extensible in that a variety of additional target devices can be supported with the relevant training data and are highly scalable in modern cloud computing environments. Implemented embodiments have been used to predict target device presence at millions of source locations with promising results.

Embodiments also support improvements to electrical grid infrastructure. In practice, the demand for electricity experiences peak loads that can cause high costs to utilities that implement electric grids as well as high environmental costs. To address this issue, utilities aim to better distribute electricity demand and alleviate the risks of peak loads. Because embodiments can identify target device energy consumption from household energy consumption, utilities can target customers with certain target devices in order to accomplish this load distribution. For example, electric vehicle charging may be identified as a factor that exacerbates or mitigates peak load. Embodiment support the discovery of utility customers with electric vehicles, and utilities can then target these customers with load distribution campaigns.

For example, to serve customers better while balancing loads on the electric grid, time of use ("TOU") rates can be used that ease the demand on the grid by shifting some of the load to off peak times. TOU rates can include incentives for customers to charge electrical vehicles off peak, such as a "Residential EV Rate" which is priced to induce customers to practice more efficient energy consumption behavior. Further, the discovery of electric vehicle presence at utility customer premises can be a factor in grid planning. For example, the burden that electric vehicle charging places on the electrical grid can be better understood when the number of utility customers with electric vehicles can be reliably estimated. In turn, when planning the electrical grid infrastructure of the future, utilities can better account for the anticipated rise in the number electrical vehicles (and other high capacity battery devices).

Embodiments can also support utilities efforts to migrate customers from natural resource (e.g., gas or fuel) appliances to electrical appliances. For example, because embodiments can discover the presence of target devices, such as electrical appliances, embodiments can also reliably discover the lack of such an electrical device. Once it is understood that a customer lacks an electrical appliance, utilities can target these customers with campaigns to transition them from a gas appliance (e.g., clothes dryer or from water heater) to electric ones. Often, natural resource appliances (especially those that are aging) are less energy efficient than their electrical counterparts, and thus such campaigns can improve overall energy efficiency across a region.

Figure 7:
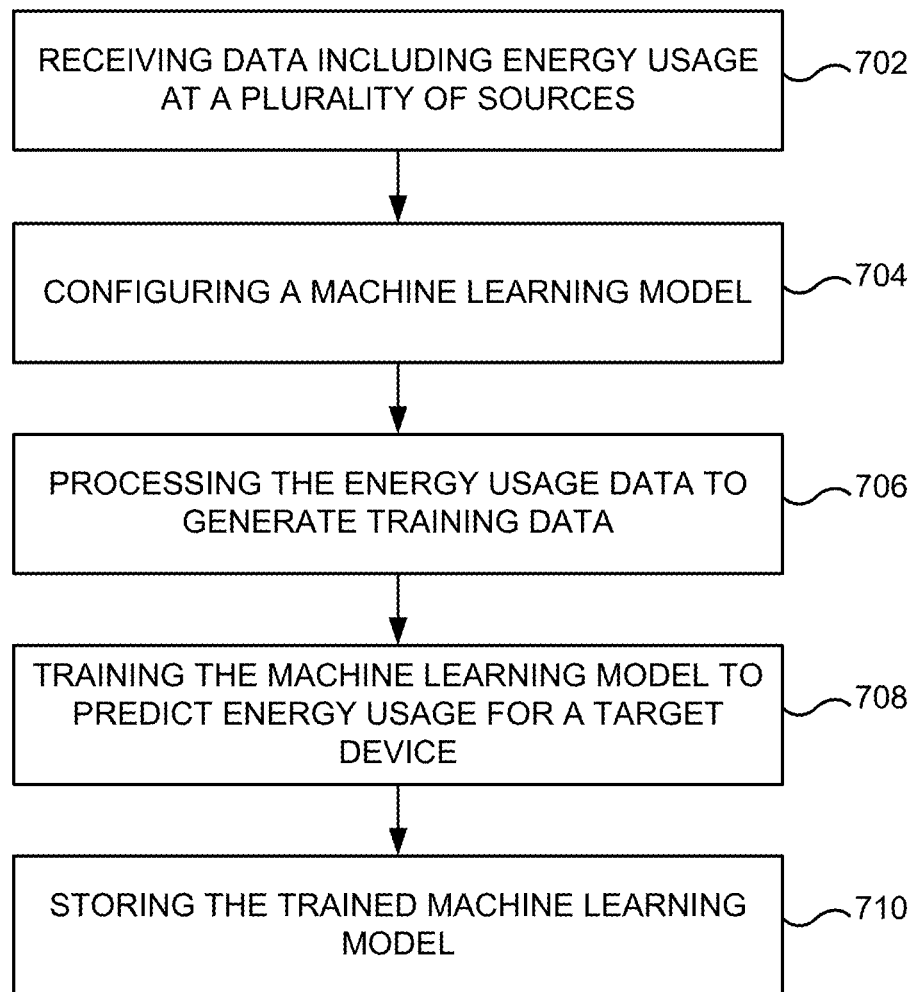
FIG. 7 illustrates a flow diagram for training a machine learning model to discover the presence of target device energy usage according to an example embodiment.

FIG. 7 illustrates a flow diagram for training a machine learning model to discover the presence of target device energy usage according to an example embodiment. In some embodiments, the functionality of FIGS. 7 and 8 can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 7 and 8 can be performed by one or more elements of system 200 of FIG. 2.

At 702, energy usage data from a plurality of source locations can be received, the energy usage data including energy usage by a target device and one or more other devices. For example, the energy usage data can be similar to the data illustrated in Table 1 above, or can include a subset of columns from Table 1. In some embodiments, the received data can include a timestamp, overall energy usage at a source location (e.g., household), and labeled energy usage data values for a target device or a surveyed indication of target device energy usage (e.g., a general label without target device energy usage specific data values). The energy usage data can be received by monitoring energy usage, from a third party, based on a joint venture, or through any other suitable channel or entity.

At 704, a machine learning model can be configured. For example, a machine learning model, such as a neural network, CNN, RNN, Bayesian network, support vector machine, a combination of any of these, or any other suitable machine learning model, can be configured. Parameters such as a number of layers (e.g., a number of hidden layers), an input shape, an output shape, a breadth, a depth, a direction (e.g., feed forward or bi-directional), activation functions, a type of layer or unit (e.g., gated recurrent unit, long-short term memory, and the like), or other suitable parameters for the machine learning model can be selected. In some embodiments, these configured parameters can be tuned (e.g., adjusted, wholly changed, added, or removed) when training the model.

In some embodiments, the machine learning model can include a CNN. In this case, parameters such as the types of layers (e.g., convolutional, pooling, fully connected, and the like), kernel size and type, stride, and other parameters can also be configured. In some embodiments, the machine learning model can include an RNN. In this case, parameters such as the type of unit (e.g., simple RNN, GRU, LSTM, and the like), direction, sequence size, depth, and other parameters can also be configured. In some embodiments, the machine learning model can include one or more CNN layers and one or more RNN layers. The CNN and/or RNN configured parameters can also be tuned when training the model.

At 706, the energy usage data can be processed to generate training data. For example, energy usage data from source locations can be cleaned, normalized, and otherwise processed to generate consistent training data (e.g., energy usage data at a given granularity, such as hourly). In some embodiments, chunks of training data can be generated that cover a predetermined duration of time (e.g., a week or a month), where the chunks of training data include source location energy usage data at the given granularity over the duration of time. In some embodiments, the target device can be at least one of an electric vehicle, a water heater, a washer, a dryer, a pool pump, an electric heating device, an electric cooling device, a heating, ventilation, and air conditioning (HVAC) device, and a photovoltaic device, and the training data includes features of the target device energy usage.

At 708, the machine learning model can be trained using the generated training data to predict the presence of target device energy usage. The training can include generation of predictions, loss calculation (e.g., based on a loss function), and gradient propagation (e.g., through layers/neurons of the machine learning model). As discussed herein, labeled energy usage for the target device and/or surveyed target device energy usage can be used to train the machine learning model.

In some embodiments, the trained machine learning model is trained using energy usage values for a plurality of source locations (e.g., households), and the training can optimize for the presence predictions of target device energy usage. In some embodiments, the training data, in some cases including labeled energy usage values from the target device(s), has a substantially hourly granularity. Other suitable granularities (e.g., 1-minute, 15-minute, 30-minute, 45-minute, and the like) can similarly be implemented.

In some embodiments, the training data can have a low resolution granularity (e.g., monthly or billing granularity) and one or more models can be trained using this low resolution granularity data. For example, a first machine learning model can be trained using a first granularity (e.g., hourly granularity and weekly chunks) while a second machine learning model can be trained using a second granularity (e.g., monthly chunks with a single or few energy usage data values). In some embodiments a single machine learning model can be trained for the first granularity, the second granularity, or a combination of these.

In some embodiments, the one or more trained machine learning models include one or more recurrent neural network layers and one or more convolutional neural network layers. Embodiments of the machine learning model(s) and/or utilized training data can be tuned based on the results of training. For example, testing of a trained model can indicate an accuracy of the trained model, and based on the testing accuracy various tuning adjustments can be made.

At 710, the trained machine learning model(s) can be stored. For example, one or more trained learning models that generate predictions meeting a criteria (e.g., accuracy criteria or threshold) can be stored such that the stored model can be used to predict the presence of target device energy usage.

Figure 8:
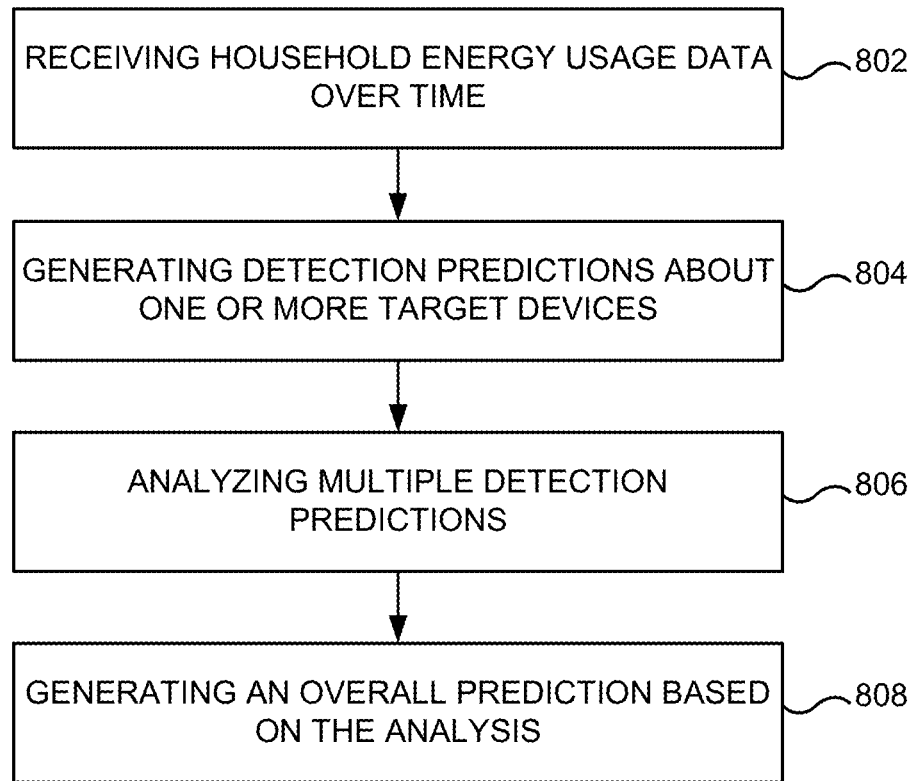
FIG. 8 illustrates a flow diagram for generating machine learning predictions to discover target device energy usage according to an example embodiment.

FIG. 8 illustrates a flow diagram for generating machine learning predictions to discover target device energy usage according to an example embodiment. For example, one or more machine learning models that are trained based on the functionality of FIG. 7 can be used to perform the functionality of FIG. 8.

At 802, multiple instances of source location energy usage can be received, for a given source location, over a period of time. For example, the source location (e.g., household) energy usage data can be broken up into time intervals based on timestamps (e.g., at a substantially hourly granularity) over a period of time, such as a day, a week, a month, or the like. Other suitable granularities can be implemented. In some embodiments, low resolution energy usage data can be received for the source location. For example, energy usage data over a month can be received, and the granularity for the data can include one or a few values (e.g., daily, monthly, or weekly).

In some embodiments, the source location energy usage data can be processed. For example, the processing can be similar to the processing of the training data (described with reference to FIG. 7). In such an example, the processing can alter the household energy usage input data to be similar to the training data, and thus the trained machine learning model can achieve enhanced prediction results. The processing can include achieving a given granularity for the energy usage data (e.g., hourly), normalization, other forms of scaling, segmentation (e.g., into weekly or monthly chunks), and any other suitable processing.

At 804, using the trained machine learning model, multiple discovery predictions for the received instances of source location energy usage can be generated, the discovery predictions representing a prediction about a presence of target device energy usage within the instances of source location energy usage. For example, processed data (e.g., multiple instances of source location energy usage at a given granularity) can be provided as input data to the trained machine learning model, and the model can generate instances of target device discovery predictions that correspond to each instance of source location energy data.

In some embodiments, the source locations are households and the received source location energy usage has at least an hourly granularity. For example, the instances of source location energy data can be household energy usage data at an hourly granularity over a week of time, and the period of time can be at least four weeks. In some embodiments, the received source location energy usage data at one of a monthly granularity, weekly granularity, and bi-monthly granularity over a month of time. For example, the period of time can be at least eight months and the instances of source location energy data can be household energy usage data at a monthly, weekly, or bi-monthly granularity over a month of time (e.g., each instance includes one or a few data values). In other examples, the period of time can be any of four months, three, months, two months, 6 weeks, and the like, and any suitable granularity can be implemented.

In some embodiments, each instance of a discovery prediction generated by the trained machine learning model is based on a corresponding instance of source location energy usage (e.g., hourly granularity over a week of time) and weather conditions associated with the corresponding instance of source location energy usage (e.g., whether conditions over the week). For example, the weather conditions are relative to the source location (e.g., household) and the weather conditions include one or more of an average temperature, a maximum temperature, and a minimum temperature, where the weather conditions relate to the duration of time associated with the corresponding instance of source location energy usage (e.g., calendar data). In some embodiments, weather conditions can include dew point, humidity, relative humidity, solar irradiance, and other suitable weather data.

At 806, the multiple discovery predictions can be analyzed and at 808, based on the multiple discovery predictions, an overall prediction about a presence of target device energy usage within the given source location's energy usage over the period of time can be generated. For example, generating the overall prediction can include combining the confidence data values corresponding to the multiple discovery predictions to generate the overall confidence data value. In some embodiments, the instances of presence predictions can be data values between a given range (e.g., between 0 and 1) and the combining can include an average, minimum, maximum, k-max average, a combination of these, and any other suitable combination technique.

In some embodiments, the discovery predictions are confidence data values that indicate the presence of target device energy usage within the instances of source location energy usage, and the overall prediction is an overall confidence data value that indicates the presence of target device energy usage within the given source location's energy usage over the period of time. For example, generating the overall prediction can include combining the confidence data values corresponding to the multiple discovery predictions to generate the overall confidence data value. In some embodiments, the overall confidence data value is compared to a criteria or threshold, and the presence of target device energy usage is positively discovered when the overall confidence data value meets or exceeds the criteria or threshold.

In some embodiments, the target device is an electric vehicle and the target device energy usage is electric vehicle charging. For example, the target device energy usage can be a first type of electric vehicle charging and/or a second type of electric vehicle charging, where the first type of electric vehicle charging is implemented by a 120-volt charger and the second type of electric vehicle charging is implemented by a 240-volt charger.

Embodiments generate machine learning predictions to discover target device energy usage. Non-intrusive load monitoring ("NILM") and/or disaggregation refers to taking as input total energy usage at a source location (e.g., energy usage at a household provided by advanced metering infrastructure) and estimating energy usage for one or more appliances, electric vehicles, and other devices that use energy at the source location. Embodiments leverage a trained machine learning model that generates predictions about the presence or target device energy usage within general energy usage at a source location. For example, the target device may be a large appliance or electrical vehicle, the source location may be a household, and the trained machine learning model is configured to receive the energy usage of the household as input and predict whether the household energy usage includes target device energy usage.

In some embodiments, instances of household energy usage can be received over a period of time. For example, household energy usage can be received at a certain granularity level (e.g., every 15 minutes, every 30 minutes, hourly, and the like) over a period of time (e.g., a week, two weeks, a month, and the like). In some embodiments, the trained machine learning model can generate multiple prediction instances for each instance of household energy usage data (e.g., four weekly predictions over a month of time). An overall prediction can then be generated based on the multiple prediction instances. For example, analytics may be performed on the prediction instances to arrive at an overall prediction about the presence of target energy usage within household energy usage over the period of time.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for generating machine learning predictions to discover electrical vehicle energy usage, the method comprising:
   storing a trained machine learning model configured to discover, within source location energy usage, a first type of electric vehicle energy usage and a second type of electric vehicle energy usage;
   receiving energy usage from multiple source locations, wherein multiple instances of energy usage over a period of time are received for each source location;
   generating, using the trained machine learning model, multiple discovery predictions for each source location, each of the discovery predictions comprising a prediction about a presence of electric vehicle energy usage within a corresponding instance of source location energy usage, wherein at least a portion of the multiple discovery predictions for a first subset of the source locations detect the presence of the first type of electrical vehicle energy usage and at least a portion of the multiple discovery predictions for a second portion of the source locations detect the presence of the second type of electrical vehicle energy usage; and
   generating, by combining the multiple discovery predictions for each source location, an overall prediction about a presence of electrical vehicle energy usage for each source location, wherein the overall predictions are used to perform energy grid demand planning, the energy grid being controlled at least in part based on the demand planning.

2. The method of claim 1, wherein the first type of electrical vehicle energy usage comprises a first type of electric vehicle charging and the second type of electrical vehicle energy usage comprises a second type of electric vehicle charging.

3. The method of claim 2, wherein the first type of electric vehicle charging uses a charger of a first voltage, the second type of electric vehicle charging uses a charger of a second voltage, and the second voltage is greater than the first voltage.

4. The method of claim 2, wherein the first type of electric vehicle charging uses a 120-volt charger and the second type of electric vehicle charging uses a 240-volt charger.

5. The method of claim 1, wherein,
   the multiple instances of energy usage for each source location cover windows of time that span the period of time, and
   the discovery predictions that correspond to the multiple instances of energy usage for each source location comprise predictions about a presence of electric vehicle energy usage within the corresponding instances of source location energy usage.

6. The method of claim 5, wherein the discovery predictions comprise confidence data values that indicate the presence of electric vehicle energy usage within the corresponding instances of source location energy usage, and the overall prediction for each source location comprises an overall confidence data value that indicates the presence of electric vehicle energy usage within each source location's energy usage over the period of time.

7. The method of claim 6, wherein,
   generating the overall prediction for each source location comprises using a mathematical function to combine the confidence data values of the multiple discovery predictions to generate the overall confidence data value for each source location,
   the overall confidence data value for each source location is compared to a criteria or threshold, and
   the presence of electric vehicle energy usage is positively discovered when the overall confidence data value meets or exceeds the criteria or threshold.

8. The method of claim 1, wherein the source locations comprise households, the instances of source location energy usage comprise household energy usage at an hourly granularity over a week of time, and the period of time comprises at least four weeks.

9. The method of claim 1, wherein the source locations comprise households and the instances of source location energy usage comprise one of a monthly granularity, weekly granularity, and bi-monthly granularity.

10. The method of claim 1, wherein the trained machine learning model comprises one or more recurrent neural network layers and one or more convolutional neural network layers.

11. The method of claim 1, wherein the portion of the multiple discovery predictions for the first subset of the source locations comprise at least one discovery prediction that detects the presence of the first type of electrical vehicle energy usage and at least one discovery prediction that detects the presence of the second type of electrical vehicle energy usage.

12. A system for generating machine learning predictions to discover electrical vehicle energy usage, the system comprising:
a processor; and
a memory storing instructions for execution by the processor, the instructions configuring the processor to:
store a trained machine learning model configured to discover, within source location energy usage, a first type of electric vehicle energy usage and a second type of electric vehicle energy usage;
receive energy usage from multiple source locations, wherein multiple instances of energy usage over a period of time are received for each source location;
generate, using the trained machine learning model, multiple discovery predictions for each source location, each of the discovery predictions comprising a prediction about a presence of electric vehicle energy usage within a corresponding instance of source location energy usage, wherein at least a portion of the multiple discovery predictions for a first subset of the source locations detect the presence of the first type of electrical vehicle energy usage and at least a portion of the multiple discovery predictions for a second portion of the source locations detect the presence of the second type of electrical vehicle energy usage; and
generate, by combining the multiple discovery predictions for each source location, an overall prediction about a presence of electrical vehicle energy usage for each source location, wherein the overall predictions are used to perform energy grid demand planning, the energy grid being controlled at least in part based on the demand planning.

13. The system of claim 12, wherein the first type of electrical vehicle energy usage comprises a first type of electric vehicle charging and the second type of electrical vehicle energy usage comprises a second type of electric vehicle charging.

14. The system of claim 13, wherein the first type of electric vehicle charging uses a charger of a first voltage, the second type of electric vehicle charging uses a charger of a second voltage, and the second voltage is greater than the first voltage.

15. The system of claim 13, wherein the first type of electric vehicle charging uses a 120-volt charger and the second type of electric vehicle charging uses a 240-volt charger.

16. The system of claim 12, wherein,
the multiple instances of energy usage for each source location cover windows of time that span the period of time, and
the discovery predictions that correspond to the multiple instances of energy usage for each source location comprise predictions about a presence of electric vehicle energy usage within the corresponding instances of source location energy usage.

17. The system of claim 16, wherein the discovery predictions comprise confidence data values that indicate the presence of electric vehicle energy usage within the corresponding instances of source location energy usage, and the overall prediction for each source location comprises an overall confidence data value that indicates the presence of electric vehicle energy usage within each source location's energy usage over the period of time.

18. A non-transitory computer readable medium having instructions stored thereon that, when executed by a processor, cause the processor to generate machine learning predictions to discover target device energy usage, wherein, when executed, the instructions cause the processor to:
store a trained machine learning model configured to discover, within source location energy usage, a first type of electric vehicle energy usage and a second type of electric vehicle energy usage;
receive energy usage from multiple source locations, wherein multiple instances of energy usage over a period of time are received for each source location;
generate, using the trained machine learning model, multiple discovery predictions for each source location, each of the discovery predictions comprising a prediction about a presence of electric vehicle energy usage within a corresponding instance of source location energy usage, wherein at least a portion of the multiple discovery predictions for a first subset of the source locations detect the presence of the first type of electrical vehicle energy usage and at least a portion of the multiple discovery predictions for a second portion of the source locations detect the presence of the second type of electrical vehicle energy usage; and
generate, by combining the multiple discovery predictions for each source location, an overall prediction about a presence of electrical vehicle energy usage for each source location, wherein the overall predictions are used to perform energy grid demand planning, the energy grid being controlled at least in part based on the demand planning.

19. The non-transitory computer readable medium of claim 18, wherein the first type of electrical vehicle energy usage comprises a first type of electric vehicle charging and the second type of electrical vehicle energy usage comprises a second type of electric vehicle charging.

20. The non-transitory computer readable medium of claim 19, wherein the first type of electric vehicle charging uses a charger of a first voltage, the second type of electric vehicle charging uses a charger of a second voltage, and the second voltage is greater than the first voltage.

* * * * *